2,765,326

PROCESS OF MAKING FLUOROCARBON CARBONYL FLUORIDES

Wayne A. Severson, Little Canada, and Thomas J. Brice, St. Paul, Minn., assignors to Minnesota Mining & Manufacturing Company, St. Paul, Minn., a corporation of Delaware No Drawing. Application August 17, 1954, Serial No. 450,513

3 Claims. (Cl. 260—408)

This invention relates to our discovery of a new and useful process of making saturated perfluorocarbon carbonyl fluoride compounds.

We have found that these product compounds can be made in good yields by a simple procedure involving the thermal reaction in vapor phase at high temperature of nitrogen dioxide ($NO_2$), or nitric oxide (NO), with corresponding saturated perfluorocarbon difluoromethylsulfonyl fluoride compounds.

These starting compounds are perfluorinated and the molecules consist of a saturated inert fluorocarbon structure united to a difluoromethylsulfonyl fluoride group ($-CF_2SO_2F$), or to more than one such group in the case of polysulfonyl compounds. Our process converts the attached difluoromethylsulfonyl fluoride group to a carbonyl fluoride group (—COF), the inert perfluorocarbon structure being retained in the corresponding product compound. The carbonyl fluoride product compounds can be readily converted to desirable derivatives, such as perfluorinated carboxylic acids and salts.

Using the symbol "$R_f$" to represent the saturated inert perfluorocarbon structure present in the molecules, the reaction is shown by the following general equation:

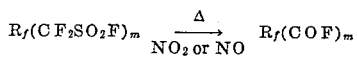

$$R_f(CF_2SO_2F)_m \xrightarrow[NO_2 \text{ or } NO]{\Delta} R_f(COF)_m$$

where $m$ is 1 in the case of monofunctional compounds, and is 2 in the case of difunctional compounds, etc. It will be understood that the polyfunctional compounds are primary, the difluoromethylsulfonyl fluoride functional groups being attached to different carbon atoms in the inert perfluorocarbon structure, as in the case of 1,10-perfluorodecanedisulfonyl fluoride used for making perfluorosebacyl difluoride, $FOC(CF_2)_8COF$. Since product compounds having from 2 to 12 carbon atoms in the molecule are of chief industrial interest, our process is of principal value in converting starting compounds having from 2 to 12 carbon atoms in the molecule.

The inert saturated perfluorocarbon structure ("$R_f$") may be either acylic or cyclic, or a hybrid. Thus it may be a perfluoroalkyl group (which consists of a $CF_3$— group or of an open chain of perfluorinated carbon atoms), or it may be a stable perfluorocycloalkyl ring of perfluorinated carbon atoms (such as a perfluorocyclohexyl ring), or it may be a perfluorinated combination of a stable ring and one or more aliphatic carbon atoms. The carbon atom of the difluoromethylsulfonyl fluoride group can be attached either to a cyclic carbon atom or to an aliphatic carbon atom. The perfluorocarbon structure may include an oxygen atom linking together two perfluorinated carbon atoms, or a nitrogen atom linking together three perfluorinated carbon atoms, since these linkages are very stable and do not impair the inert and stable fluorocarbon characteristic of the structure (cf., U. S. Patents Nos. 2,500,388 and 2,616,927).

A feature of our process is its simplicity. Good results can be obtained by merely passing a gaseous mixture of the $NO_2$ (or NO) and the fluorocarbon sulfonyl fluoride starting compound through an empty tube which is maintained at a temperature of the order of 450° to 650° C. Tubes of nickel, nickel alloys, stainless steel, mild steel, and platinum can be used. Using a substantially optimum ratio of reactants, and a tube temperature of about 550° C., a reaction contact time of less than 30 seconds has been found sufficient to produce a substantially complete conversion and a high yield, and in some experiments contact times as short as 1 to 10 seconds have given high conversions and yields.

Nitrogen dioxide is the preferred reactant and best yields are obtained when the $NO_2/CF_2SO_2F$ mole ratio of the feed stock is at least 3:1. The need of maintaining an $NO_2$ mole ratio of greater than unity is partly due to reaction between $NO_2$ and the sulfonyl fluoride group to form nitrosyl fluorosulfonate, $NOSO_3F$. At a tube temperature of about 550° C., experiments have shown that the yield increases when the mole ratio is increased to about 3.5:1 to 4:1 and then levels off with only a gradual decrease as the ratio is further increased to about 7:1. The optimum mole ratio appears to be in the range of about 3.5:1 to 4:1. When nitric oxide is used a $NO/CF_2SO_2F$ mole ratio somewhat in excess of 1:1 is preferred. A mixture of $NO_2$ and NO can be used. It will be understood that the $NO_2$ (or NO) can be supplied by using another compound that decomposes in the reaction zone to form it in situ. The gas mixture feed stock can be diluted with an inert gas if desired. Although the reaction can be satisfactorily employed in an empty tube and without the use of a catalyst, the use of packed tubes and of catalysts is not precluded.

A useful yield of perfluorocarbon carbonyl fluoride product cannot be obtained by mere pyrolysis of the perfluorocarbon sulfonyl fluorides. Nor is the result due to the mere fact that $NO_2$ and NO are oxidizing agents, as shown by the fact that negative results were obtained in experiments using air, oxygen, nitrous oxide, sulfur, sulfur dioxide and sulfur trioxide. Thus $NO_2$ and NO have a peculiar utility. So far as we are aware, our process is the only one thus far discovered by which fluorocarbon sulfonyl fluorides can be converted to the corresponding carbonyl fluorides in good yields.

The reaction product mixture, after leaving the reaction tube, can be condensed and the perfluorocarbon carbonyl fluoride product recovered by fractional distillation. However, it is not necessary to recover this product as such. It can be usefully recovered by treating a reaction product mixture so as to convert it to a derivative that is recovered, as by hydrolyzing with a base to form the corresponding fluorocarbon carboxylate salt, or by hydrolyzing with water to form the corresponding fluorocarbon carboxylic acid, which is recovered.

The following experiments are illustrative of our process:

EXAMPLE 1

This experiment illustrates the use of nitrogen dioxide in converting polycarbon perfluoroalkanemonosulfonyl fluorides to the corresponding perfluoromonoacyl fluorides:

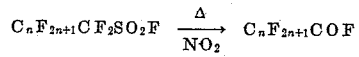

$$C_nF_{2n+1}CF_2SO_2F \xrightarrow[NO_2]{\Delta} C_nF_{2n+1}COF$$

In the above formulas $n$ is 1 or a higher integer and is the number of carbon atoms in the inert perfluoroalkane group that is carried over intact to the corresponding product compound. Thus the starting compounds are polycarbon compounds, since they contain a total of at least two carbon atoms, one of which provides the carbonyl carbon atom of the product compound.

The reactor was an empty nickel pipe 1 inch in diameter and 21 inches long, mounted in an inclined position in a 13 inch electric furnace. The temperature was measured with a thermocouple embedded midway in the wall of the pipe. The $NO_2$ was metered at a controlled rate through a flowmeter, and the sulfonyl fluoride in liquid form was continually mixed into the gas stream from a calibrated burette and vaporized to provide the gaseous charging stock, which was fed in at the upper end of the reactor pipe. The exit (lower end) of the reactor pipe was connected to a trap cooled with ice, and the volatile products passing from the latter were condensed in a liquid air trap. The experiment was conducted at atmospheric pressure.

In this experiment, perfluoropentanesulfonyl fluoride was converted to perfluoropentanoyl fluoride:

$$C_4F_9CF_2SO_2F \xrightarrow[NO_2]{\Delta} C_4F_9COF$$

which was recovered as the potassium salt, $C_4F_9COOK$.

The reactor tube was maintained at a center wall temperature of approximately 550° C. The charging stock was passed through the reactor during a period of 15 minutes and consisted of 20.4 grams of the sulfonyl fluoride compound and 7.5 grams of $NO_2$. The mixture of volatile products (boiling below 40° C.), recovered from the liquid air trap, weighed 20.1 grams and was bubbled through cold water. The water solution was neutralized with potassium hydroxide, and was then evaporated to dryness, leaving a dry residue weighing 23.4 grams. The residue was extracted with ethanol and the ethanol solution was evaporated to dryness. The residue weighed 8.0 grams and was identified as the relatively pure $C_4F_9COOK$ salt, obtained in a yield of 46%.

EXAMPLE 2

This experiment illustrates the preparation of $$C_7F_{15}COF$$

(perfluorooctanoyl fluoride) and its recovery as the acid, $C_7F_{15}COOH$ (perfluorooctanoic acid).

The same thermal reaction procedure was followed except that the charging stock consisted of 11 grams of $NO_2$ and 30 grams of perfluorooctanesulfonyl fluoride, $C_7F_{15}CF_2SO_2F$ (the mole ratio being 4:1), and was fed into the reactor pipe during a period of 24 minutes. A total of 23.8 grams of liquid was collected in the ice-cooled trap, and was stabilized to 40° C. before being worked up in order to largely remove volatile oxides of nitrogen. This high-boiler fraction, containing the $C_7F_{15}COF$ reaction product (perfluorooctanoyl fluoride) and a minor proportion of $C_6F_{13}COF$ by-product, together with small amounts of other materials, was hydrolyzed by being poured into 150 ml. of cold water contained in a separatory funnel. Sufficient concentrated $H_2SO_4$ was added to produce a 20 wt. percent aqueous solution. Then 100 ml. of c—$C_6F_{12}O$, an inert cyclic fluorocarbon ether (cf., U. S. Patent No. 2,644,823) was added to extract the fluorocarbon acids, forming a lower phase, which was removed, and the aqueous phase was again extracted. The extracts were combined and the fluorocarbon ether solvent was distilled off by gentle heating under vacuum. The residue weighed 17.5 grams and consisted of a mixture of crude $C_7F_{15}COOH$ and $C_6F_{13}COOH$ acids in a total yield of 71% (based on the sulfonyl fluoride starting compound charged to the reactor). Recovery and separation of these acids by fractional distillation showed that they were present in the approximate weight ratio of 3 to 1, the yield of $C_7F_{15}COOH$ (B. P. 185–189° C.) being 13.4 grams. Thus the yield of $C_7F_{15}COF$, and of the corresponding $C_7F_{15}COOH$ acid, each exceeded 50%.

EXAMPLE 3

This experiment illustrates the preparation of $C_9F_{19}COF$ (perfluorodecanoyl fluoride) and its recovery as the acid, $C_9F_{19}COOH$ (perfluorodecanoic acid).

The procedure was the same as in the preceding example. The charging stock consisted of 7.2 grams of $NO_2$ and 25.2 grams of perfluorodecanesulfonyl fluoride, $C_9F_{19}CF_2SO_2F$, and was fed into the reactor pipe during a period of 15 minutes. The crude acid was recovered in a yield of 12.4 grams. It was fractionated under reduced pressure and 10.8 grams (50% yield) of the $C_9F_{19}COOH$ acid, having a boiling point of 140–145° C. at 100 mm. pressure, was obtained.

EXAMPLE 4

This example illustrates the preparation of $C_7F_{15}COF$ using nitric oxide in place of nitrogen dioxide.

The charging stock consisted of 10.8 grams of $$C_7F_{15}CF_2SO_2F$$

and 4.4 grams of NO, fed into the reactor pipe during a period of approximately 15 minutes. The temperature was approximately 550° C. From the liquid collected in the ice-cooled trap, there was recovered by fractional distillation 3.1 grams of crude $C_7F_{15}COF$ (yield of 37%).

EXAMPLE 5

The reactor consisted of a vertical empty platinum-lined nickel tube having an inside diameter of 5/16 inch and a length of 21 inches mounted inside a 13 inch vertical electric furnace. The bottom of the tube was directly connected to an electrically heated Monel-metal trap followed by an ice-cooled condenser trap. The vapor phase charging mixture was introduced through an inlet tube connected to the upper end of the reactor tube. This arrangement has the advantage that $NOSO_3F$ (nitrosyl fluorosulfonate) formed during the reaction drains into the bottom trap, which was maintained at a temperature of 150–200° C. to keep it fluid.

In a run of over two hours, using a charging stock of $NO_2$ and $C_7F_{15}CF_2SO_2F$ in a 3.5:1 mole ratio, a reaction zone contact time of approximately 10 seconds, and a reaction tube temperature of approximately 560° C., the sulfonyl fluoride starting compound underwent complete conversion. The reaction zone contact time was calculated on the assumptions that the reaction zone was that portion in which the wall temperature was higher than 450° C., that the number of moles of gases was the sum of the moles of $NO_2$ and sulfonyl fluoride (no allowance being made for dissociation), and that there was compliance with the perfect gas laws. The high-boiler reaction product was hydrolyzed and distilled to give a 74.5% yield of crude $C_7F_{15}COOH$ (B. P. 182–193° C.). The total yield of perfluorinated acids, determined analytically, was 85% of theoretical. Only 3.8% of the total acid boiled in the $C_6F_{13}COOH$ range and no $C_8F_{18}$ was found. 82.5% of the theoretical amount of sulfur was found in the form of $NOSO_3F$ collected in the bottom trap.

This example illustrates operations under presently preferred conditions to obtain high yields, namely, a mole ratio of $NO_2$ to sulfonyl fluoride starting compound of about 3.5:1 to 4:1, a reactor tube temperature of about 550° C., and a reaction zone contact time of about 1 to 10 seconds.

Preparation of sulfonyl fluoride starting compounds

The perfluorinated fluorocarbon difluoromethylsulfonyl fluorides used as starting compounds in the present process can be prepared in good yields by the electrochemical fluorination of corresponding hydrocarbon sulfonyl fluoride and chloride compounds, serving to replace the hydrogen atoms by fluorine atoms and, when sulfonyl chloride compounds are employed, serving also to replace the chlorine atoms so as to obtain a sulfonyl fluoride product. Unsaturated starting compounds can be used, such as aryl-alkyl sulfonyl fluorides and chlorides, since the process results in fluorine addition to cause saturation.

According to this procedure, a mixture of liquid hydrogen fluoride and the hydrocarbon sulfonyl fluoride or chloride is electrolyzed in a nickel-anode cell at a cell voltage of approximately 4 to 6 volts. The saturated perfluorinated sulfonyl fluoride product is insoluble in liquid HF and will either evolve in admixture with the hydrogen and other cell gases or will settle to the bottom of the cell in admixture with other products, depending on the volatility of the particular compound and the operating conditions. It can be recovered from the mixture by fractional distillation.

This process of making perfluorinated sulfonyl fluorides is described and claimed in the copending application of T. J. Brice and P. W. Trott, S. N. 334,083, filed January 29, 1953, and since issued as Patent No. 2,732,398 on January 24, 1956.

The equipment and operating procedures used in the electrochemical fluorination process have been described in the U. S. Patent of J. H. Simons, No. 2,519,983 (Aug. 22, 1950), and in a paper by E. A. Kauck and A. R. Diesslin published by the American Chemical Society in Industrial and Engineering Chemistry, vol. 43, pp. 2332–2334 (October 1951).

The following table lists the approximate boiling points (at 740 mm.) of a number of representative perfluoroalkanesulfonyl fluorides, which can be converted by our process to the corresponding perfluorinated acyl fluorides:

| Compounds: | B. P. (°C.) |
|---|---|
| $CF_3CF_2SO_2F$ | 7 |
| $CF_3(CF_2)_4SO_2F$ | 90 |
| $CF_3(CF_2)_5SO_2F$ | 115 |
| $CF_3(CF_2)_7SO_2F$ | 154 |
| $CF_3(CF_2)_9SO_2F$ | 190 |
| $CF_3(CF_2)_{11}SO_2F$ | 222 |
| $CF_3(CF_2)_{13}SO_2F$ | 250 |

These perfluorinated sulfonyl fluoride starting compounds have a high degree of thermal stability and are relatively unreactive. They are insoluble in water, and are highly stable to hydrolysis in neutral and acidic aqueous solutions, but they are soluble in oxygenated organic solvents.

We claim:

1. A process of making perfluorocarbon carbonyl fluorides which comprises thermally reacting at a temperature of the order of 450 to 650° C. a vapor phase mixture of a saturated perfluorocarbon difluoromethylsulfonyl fluoride and a compound of the class consisting of nitrogen dioxide and nitric oxide which is present in a mole ratio to $CF_2SO_2F$ of greater than unity, the fluoride starting compound having an inert perfluorocarbon structure that is retained in the corresponding product compound.

2. A process of making perfluoromonoacyl fluorides which comprises passing a gaseous mixture of nitrogen dioxide and a polycarbon perfluoroalkanemonosulfonyl fluoride, in a mole ratio of 3:1 to 7:1, through a heated reactor tube maintained at a temperature of 450 to 650° C.

3. A process of making perfluorooctanoyl fluoride which comprises passing a gaseous mixture of $NO_2$ and $C_7F_{15}CF_2SO_2F$, in a mole ratio of about 3.5:1 to 4:1, through a heated reactor tube maintained at a temperature of about 550° C. and for a short reaction zone contact time so as to obtain a yield of $C_7F_{15}COF$ exceeding 50%.

References Cited in the file of this patent

UNITED STATES PATENTS

| 2,567,011 | Diesslen et al. | Sept. 4, 1951 |
| 2,593,737 | Diesslen et al. | Aug. 22, 1952 |